Jan. 5, 1943. E. C. HORTON Re. 22,244
WIPER ARM
Original Filed Sept. 30, 1937
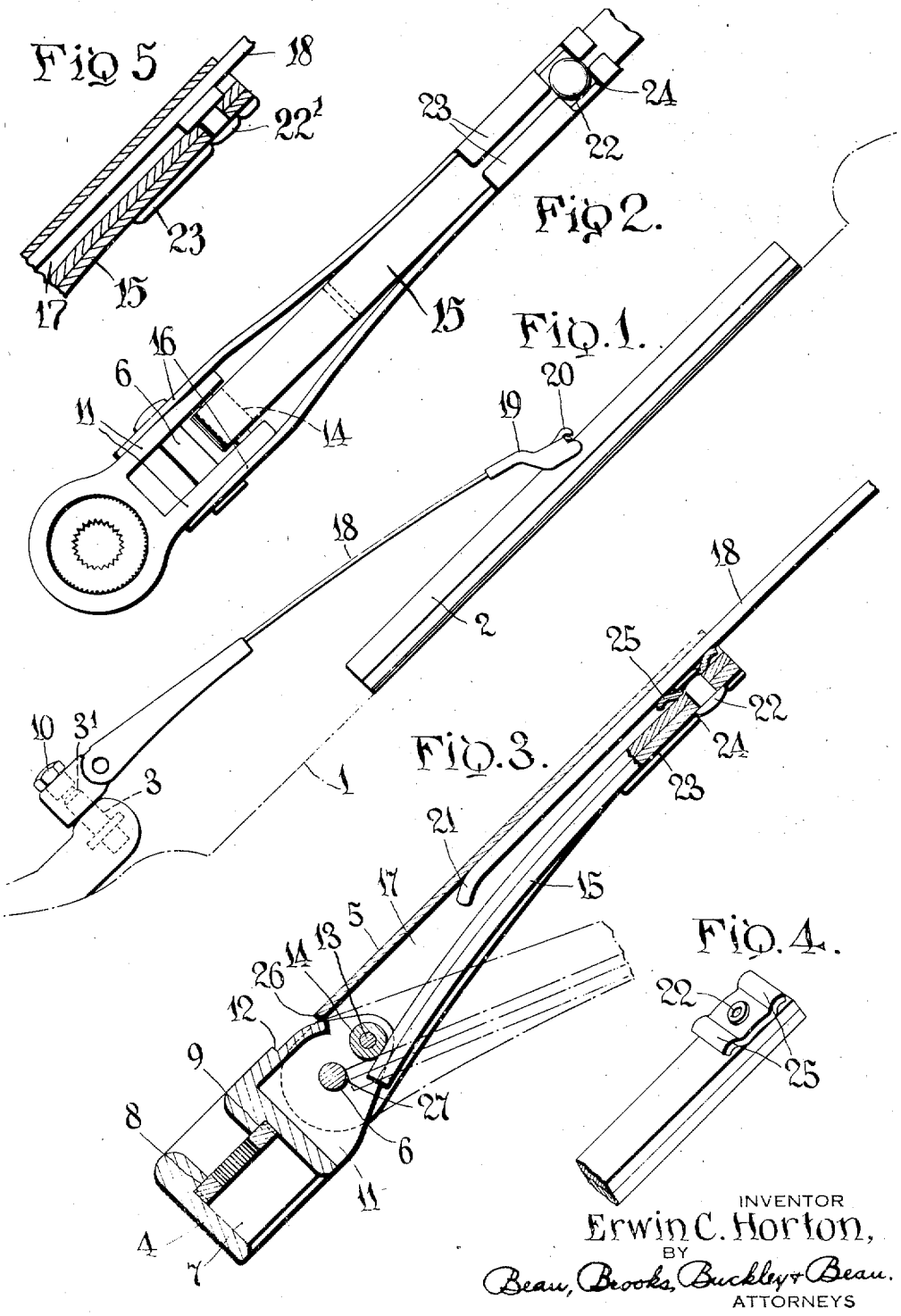
INVENTOR
Erwin C. Horton,
BY
Beau, Brooks, Buckley & Beau.
ATTORNEYS Reissued Jan. 5, 1943

Re. 22,244

UNITED STATES PATENT OFFICE 22,244

WIPER ARM

Erwin C. Horton, Hamburg, N. Y., assignor to Trico Products Corporation, Buffalo, N. Y.

Original No. 2,260,903, dated October 28, 1941, Serial No. 166,596, September 30, 1937. Application for reissue October 17, 1942, Serial No. 462,418. In Great Britain December 16, 1936

9 Claims. (Cl. 15—255)

This invention relates to the art of windshield cleaners and more particularly to the construction of the wiper arm which carries or actuates the wiping element back and forth across the windshield surface.

In my patent granted September 17, 1940, No. 2,215,371, there is disclosed an articulated wiper arm embodying a leaf spring to provide the desired pressure in the wiping contact of the blade on the windshield.

The present invention is an improvement thereon and it has for its object to provide a simplified arrangement and construction of parts by which the wiper arm may be economically manufactured in mass production and, further, to provide a wiper arm which embodies certain structural features tending to extend the period of usefulness of the article.

In the drawing which illustrates one embodiment of the present invention:

Fig. 1 shows in side elevation the improved wiper arm as installed on a windshield;

Fig. 2 is a fragmentary inside elevation of the wiper arm;

Fig. 3 is a longitudinal sectional view through a portion of the arm showing its construction more in detail;

Fig. 4 is a fragmentary perspective view of the anchored end of the pressure spring; and Fig. 5 is a fragmentary longitudinal section through a modified form of the invention.

Referring more particularly to the drawing, the numeral 1 designates the windshield of a motor vehicle, 2 the wiper blade thereon, and 3 the wiper operating shaft. This shaft is mounted either at the lower or upper side of the windshield and operatively connected to the blade 2 by the wiper arm which comprises an inner or fixed section 4 and an outer blade carrying section 5. These two arm sections are pivotally connected by the pin 6 to permit the outer section swinging toward and from the windshield surface.

The fixed arm section has a shaft receiving opening 7 which is counterbored to form an internal shoulder 8 to support a ring 9. The outer periphery of the ring is knurled for being pressed into firm interlocking engagement with the wall of the opening 7, while the inner periphery of the ring is knurled to interlock with a shoulder 3' on the actuating shaft 3 when pressed into engagement therewith in tightening the attaching nut 10. The section 4 has a channeled arm part 11 formed with an exterior stop shoulder 12 and a wall portion extending therefrom substantially concentric with the pivot pin 6. The side walls 11 extend outwardly beyond the pivot pin and support a bearing 13 which is equipped with an anti-friction roller 14 to ease the action of a leaf spring 15 riding thereon. In this connection it will be observed that these side walls which support the roller bearing 14 project into the channel 17 a distance sufficient to obstruct the adjacent end of the bottom wall of the channel swinging thereover and therefore the projecting side walls and their roller will be yieldably confined between the spring 15 and the bottom wall of the channel.

The outer arm section which carries this spring 15 is preferably formed of sheet metal with a channel 17 having its side walls extended to form a pair of ears 16 for straddling the arm part 11 and pivoting on the pin 6. Within the channel 17 is slidably received a resilient strip 18 which constitutes an adjustable arm extension for the outer section 5 and is terminally equipped with a blade attaching part 19 for interlocking with the blade carried hook 20. The end of the extension 18 which lies within the channel 17 is deformed as at 21 to prevent the extension being entirely withdrawn from the channel. The spring 15, which is shown as consisting of a plurality of spring leaves held together by a rivet 22, is of the cantilever type, i. e., anchored at one end and free at the other end for deflection, and therefore the term leaf as used herein comprehends a bar-like or leaf-like body so mounted whether the body is laminated or not and regardless of the cross sectional form thereof. In the illustrated embodiment the spring is anchored at the outer end of the channel by bending extended portions 23 of the channel side walls thereover, as illustrated in Figs. 2 and 3. These bent over side wall portions are recessed at 24 to receive and interlock with the head of the rivet 22 so as to secure the pressure spring 15 against longitudinal play. The anchored end of the spring may bear directly upon the arm extension 18 to frictionally secure the latter in an adjusted position, as shown in Fig. 5, since the spring is normally held deflected by the support 13, 14 and consequently the anchored end of the spring is urged firmly against the arm extension 18. Before the pivot 6 is put in position the arm extension 18 is first placed in the channel 17 and then the spring 15 superimposed thereupon following which the extended portions 23 are bent over to effect the interlock 22, 24. Until the spring 15 is deflected by assembling the inner and outer arm sections the spring 15 need not bear firmly on the arm extension 18 since when the spring is subjected to its normal deflection as shown in Fig. 3, it will bear heavily upon the inner ends of the bent over flange portions 23, more after the manner of a fulcrum support, and thereby urge the extremity of the anchored spring end, or its rivet 22', firmly down upon the arm extension 18 to provide the frictional securement for the latter. To increase the friction and provide a more flexible construction a spring plate or shoe 25 may be interposed, as shown in Figs. 3 and 4, the same being secured by the rivet 22 to the spring 15 as a unit to facilitate the assembling of the arm parts. This interposed spring plate also facilitates the securement of the spring in place by holding the rivet head out in its interlocking relationship with the side wall portions.

In assembling the parts of the outer arm section, the extension 18 is placed in the channel 17 and thereon the spring 15 is positioned, following which the side wall portions 23 are bent over to clamp and secure the parts together with the extension being held under a predetermined friction. The inner end of the channel is formed with a transverse shoulder 26 to engage the shoulder 12 and thereby restrict the outward swinging movement of the section 5 on the fixed or inner section. Inward swinging movement of the outer section, when not obstructed by the windshield, as when the arm is displaced from its shaft, is limited either by the bottom wall of the channel 17 engaging the extending portions of the side walls 11 or by the inner free end of the spring 15 abutting the pivot pin 6 as indicated by the broken lines 27. Consequently the relative movement between the component arm sections is restricted in both directions of swing against deformation from undue straining of parts.

The arm construction is practical and is economically manufactured by machine operations in mass production, and while the construction has been given in great detail, it is not intended thereby to restrict the scope of the same since obviously the inventive principles thereof may be incorporated in other physical embodiments without departing from the spirit of the invention.

What is claimed is:

1. A wiper arm for windshield cleaners, comprising a shaft engaging section and a blade actuating section pivotally connected thereto, the blade actuating section having a channel with an extensible blade engaging part adjustable therein, and a spring seated at one end on the extensible part in the channel and having its opposite end portion thereof bearing laterally on a part of the companion section to provide spring pressure for the wiping contact of a supported blade, such spring being firmly embraced at its first end by a channel wall to anchor the spring in position.

2. A wiper arm comprising pivotally joined inner and outer arm sections, one of said sections having a channel, a spring disposed in the channel and anchored therein by an embracing wall of the channel, the spring having a free end portion bearing laterally under pressure on a part of the companion section, such part varying the spring pressure by altering the deflection of the spring upon relative pivotal movement between the sections, and a wiper actuating extension slidably adjustable in the channel beneath the spring in frictional engagement therewith, such frictional engagement varying in accordance with the increase or decrease of spring deflection by said part.

3. A wiper arm comprising pivotally joined inner and outer arm sections, one of said sections having a hollow formation, a spring anchored at one end in the hollow with a free end portion supported under lateral deflection by a part of the companion section which deflection varies according to the movement of said part during relative pivotal movement of the sections, and an extension slidably and frictionally adjustable in the hollow, said spring carrying a friction shoe for bearing on said extension.

4. A wiper arm for windshield cleaners, comprising a shaft engaging section and a blade actuating section pivotally connected thereto, the blade actuating section having a channel receiving an extensible blade engaging part, and a spring having one end disposed in the channel and exerting pressure on the extensible part to frictionally hold the same in longitudinal adjustment, the opposite end of the spring bearing laterally on a part of the companion section to provide spring pressure for the wiping contact of the engaged blade, such spring being firmly embraced at its first end by the opposed walls of the channel being folded thereover to anchor the spring in position.

5. A wiper arm, comprising inner and outer sections of channel formation arranged end to end and formed with opposed hinge parts pivotally connected together by a pivot, the inner section having a shaft engaging part on one end and spaced side walls at the opposite end projecting beyond the pivot to and between the side walls at one end of the outer section, the opposite end of the latter section adapted to engage a wiper, and a spring anchored at one end on the outer section and having its opposite end free for lateral deflection and slidably supported on a bearing carried by and between the spaced walls of the inner section at a point between the spring anchorage and the pivot, said free end portion of the spring being disposed between the spaced walls of the inner section for guidance thereby, such spaced walls last mentioned having portions upstanding from the bearing at opposite sides of the spring to confine the latter to the bearing.

6. A wiper arm adapted for mounting on an actuating shaft and having inner and outer sections arranged end to end and of channel formation with side and bottom walls, one of said sections having ears extending from its side walls on opposite sides of the companion section and connected to the side walls of the latter section by pivot means, said companion section having its side walls extending into the channel of the first specified section for a distance greater than that between the pivotal axis and the bottom wall of the first specified section to be obstructed by such bottom wall upon relative pivoting movement of the sections in one direction, and a cantilever spring anchored at one end in the channel of the first specified section, the extending side walls of the companion section being joined by a pin set inwardly from the margins of such extending side walls whereby the margins will constitute upstanding guides, and said spring having its opposite end free for lateral deflection and slidably retained on said pin by said marginal guides for yieldably confining the extending side walls and urging them toward the obstructing bottom wall.

7. A wiper arm for windshield cleaners, comprising inner and outer sections pivotally connected together, one of said sections having a channel with an extension therein, the opposite ends of the arm as defined by the other section and said extension being designed for operatively connecting a driving shaft to a blade, and a spring seated in the channel and exerting clamping pressure upon the extension with one free end portion of the spring bearing laterally on a part of the companion section to provide spring pressure for the wiping contact of a supported blade, a side wall of the channel being bent to oxerlie and interlock with the spring, said extension supporting said spring in interlocking relation with such bent over portion of the channel wall.

8. A wiper arm for windshield cleaners, comprising a shaft engaging section and a blade actuating section pivotally connected thereto, one of said sections being of channel formation and slidably receiving an extensible section for varying the longitudinal dimension of the wiper arm, a spring having one end disposed in the channel over the extensible section and its opposite end bearing laterally on a part of the other of said first two named sections to provide spring pressure for the wiping contact of an associated blade, one of the channel walls being bent over the first end of the spring and formed with a part interlocking with a part on the spring to hold the latter against longitudinal movement in the channel, and a resilient member interposed between the first end of the spring and the underlying extensible section and functioning to maintain such interlock.

9. A wiper arm comprising pivotally joined inner and outer arm sections, one of said sections having a hollow formation channeled in cross section, a spring anchored at one end in the hollow with the opposite free end portion supported under lateral deflection by a part of the companion section which deflection varies according to the movement of said part during relative pivotal movement of the sections, an extension slidably and frictionally adjustable in the hollow, and a friction shoe for bearing on said extension within the hollow, said friction shoe cooperating with the spring in the hollow to hold the extension in an adjusted position.

ERWIN C. HORTON.